(12) United States Patent
Griessbaum et al.

(10) Patent No.: US 8,670,950 B2
(45) Date of Patent: Mar. 11, 2014

(54) FALSE ECHO STORAGE IN CASE OF CONTAINER NOISE

(75) Inventors: Karl Griessbaum, Muehlenbach (DE); Roland Welle, Oberwolfach (DE)

(73) Assignee: VEGA Grieshaber KG, Wolfach (DE)

( * ) Notice: Subject to any disclaimer, the term of this patent is extended or adjusted under 35 U.S.C. 154(b) by 584 days.

(21) Appl. No.: 12/939,687

(22) Filed: Nov. 4, 2010

(65) Prior Publication Data

US 2011/0238352 A1     Sep. 29, 2011

Related U.S. Application Data

(60) Provisional application No. 61/317,892, filed on Mar. 26, 2010.

(30) Foreign Application Priority Data

Mar. 26, 2010   (EP) .................................. 10157940

(51) Int. Cl.
     *G01F 25/00*    (2006.01)
(52) U.S. Cl.
     USPC ............ 702/100; 702/55; 702/191; 702/195; 324/612; 324/613; 324/620; 333/194
(58) Field of Classification Search
     USPC ............... 702/55, 82, 90, 100, 104, 191, 195; 324/612, 613, 620; 333/194
     See application file for complete search history.

(56) References Cited

U.S. PATENT DOCUMENTS

| | | | | |
|---|---|---|---|---|
| 4,831,565 A * | 5/1989 | Woodward | .................... | 702/103 |
| 5,036,477 A * | 7/1991 | Forster et al. | ................... | 702/97 |
| 5,157,639 A | 10/1992 | Leszczynski | | |
| 5,285,388 A * | 2/1994 | McCoy et al. | ................. | 702/12 |
| 5,453,932 A * | 9/1995 | Brabec | ........................... | 701/50 |
| 5,521,851 A * | 5/1996 | Wei et al. | ..................... | 702/195 |
| 5,587,969 A | 12/1996 | Kroemer et al. | | |
| 5,671,154 A * | 9/1997 | Iizuka et al. | ................... | 702/39 |
| 5,784,241 A * | 7/1998 | Munch et al. | ................. | 361/111 |
| 6,438,500 B1 * | 8/2002 | Froger et al. | ................... | 702/55 |
| 6,529,445 B1 * | 3/2003 | Laws | ........................... | 367/151 |
| 6,782,347 B2 * | 8/2004 | Hirano et al. | ................ | 702/183 |
| 7,013,226 B2 * | 3/2006 | Han et al. | ........................ | 702/57 |
| 7,334,451 B1 * | 2/2008 | Fauveau | ........................ | 73/1.73 |
| 7,421,377 B2 * | 9/2008 | Zhang | ............................ | 702/191 |
| 7,657,403 B2 * | 2/2010 | Stripf et al. | .................. | 702/190 |
| 7,747,397 B2 * | 6/2010 | Welle et al. | .................... | 702/55 |
| 2005/0035769 A1* | 2/2005 | Otto et al. | ..................... | 324/644 |
| 2006/0052954 A1* | 3/2006 | Welle et al. | .................... | 702/55 |

FOREIGN PATENT DOCUMENTS

| | | |
|---|---|---|
| DE | 33 37 690 | 4/1985 |
| DE | 43 08 373 | 9/1994 |
| DE | 44 07 369 | 9/1995 |
| EP | 1 628 119 | 2/2006 |

\* cited by examiner

*Primary Examiner* — Sujoy Kundu
*Assistant Examiner* — Paul D Lee
(74) *Attorney, Agent, or Firm* — Fay Kaplun & Marcin, LLP

(57) ABSTRACT

The invention relates to false echo storage in the area of level measurement. The decision as to whether or not to initialize and/or update the false echo memory is made using at least one value for the sensor-inherent noise, container noise and/ or EMC noise for this purpose. This may make it possible to avoid identifying a false echo as the level echo.

12 Claims, 8 Drawing Sheets

| ID | Echo position/m | Echo amplitude/dB | False echo evaluation |
|---|---|---|---|
| 303 - E0 | 10 | 30 | 100% |
| 304 - E1 | 11 | 30 | 0% |

| ID | Echo position/m | Echo amplitude /dB | False echo evaluation |
|---|---|---|---|
| E0 | 10 | 30 | 100% |
| E3 | 17 | 20 | 0% |

FALSE ECHO STORAGE IN CASE OF CONTAINER NOISE

RELATED APPLICATIONS

The present application claims the priority of European Patent Application 10 157 940.7, filed on Mar. 26, 2010, and U.S. Provisional Application 61/317,892, filed on Mar. 26, 2010, the content of which are incorporated herein by reference.

FIELD OF THE INVENTION

The present invention relates to level measurement. In particular, the invention relates to a level meter for measuring a level and storing false echoes, a method for measuring a level and storing echoes, a program element and a computer-readable medium.

TECHNICAL BACKGROUND OF THE INVENTION

In level sensors operating based on FMCW or pulse transit time procedures, electromagnetic or acoustic waves are emitted in the direction of a surface. The sensor then records the echo signals reflected by the filler and components inside the container, and derives the respective level from that. Other level sensors work according to the principle of guided microwaves.

The method normally used according to the current state of the art essentially builds upon a false echo storage process to be performed by the user when the container is empty.

DE 33 37 690 A1, U.S. Pat. No. 5,157,639 and EP 1 628 119 A2 describe such methods.

The methods described therein may lead to problems during practical implementation.

SUMMARY OF THE INVENTION

The features in the independent claims indicate a level meter for measuring a level and storing false echoes, a method for measuring a level and storing echoes, a program element and a computer-readable medium. For example, the features described below in reference to the method may be implemented in the level meter, and hence also constitute features of the level meter. In like manner, the features of the level meter mentioned below can also be implemented as method steps.

It should be noted that, within the context of the invention, initializing false echo data in a level meter may represent a special variant of updating false echo data in a level meter. In this case, the false echo data can thus be "updated" by initializing false echo data.

It should further be noted that updating false echo data may also encompass updating at least one datum that can subsequently be used to identify false reflections of components inside the container based on known methods. As a consequence, updating the fault memory curve within a false echo memory is only one possible way of updating the false echo data. False echo storage is also one way of updating the false echo data. In addition, updating a fault memory or false echo memory is a way to update the false echo data.

A first aspect of the invention indicates a level meter for measuring a level and storing false echoes, which has a processor (in the following also referred to as computer) for initializing and/or updating false echo data. The computer is here designed to decide whether or not the false echo data are to be initialized and/or updated as a function of at least a first value, which describes a property of a first noise or at least corresponds with a first noise. In addition, the computer is designed to then actually carry out the update.

The first "noise" is a sensor-inherent noise, for example thermal noise, and/or container noises and/or EMC noises. In other words, the noise is attributable to the internal configuration of the sensor and/or attributable to the container and/or attributable to external electrical, electromagnetic, acoustic or optical influences acting on the sensor and/or container. This noise can affect the measuring signal, and hence the echo curve, thus making it possible to describe the noise based on an analysis of the echo curve.

Within the context of this invention, sensor-inherent noise is defined as noise caused by the internal configuration of the sensor, for example by the electronic components used therein and the thermal noise they make.

Container noise is defined as noise caused by a plurality of periodic deviations of the signal originally emitted by the sensor. The plurality of periodic deviations can here be caused by a plurality of possible reflections inside a container.

EMC noise is defined as noise attributable to the influence of external sources. For example, EMC noise can be caused by wire-bound electrical interference within the supply line of the sensor, or by wireless, electromagnetic interference, e.g., of the kind generated by mobile communications systems. In addition, EMC noise can be caused by acoustic interference, for example the noise arising during a pneumatic filling process. It is also possible for EMC noises to be caused by optical influences, for example scattered light.

Common to all noise influences is that they can lead to a rise in the measurable noise level within the measured signal of a level meter. In addition, it might happen that combinations of the described noise types will overlap, resulting in an overall noise level that can be detected with measurement techniques.

For example, one property of noise may be the average value of the signal in proximity to the noise. Another property may be a variance, or even a bandwidth of the noise in the signal. In addition, several statistical values derivable from the measuring signal may represent a property of the noise in combination according to prior art. Further, random samples of the signal or filtered signal progressions may be a property of the noise.

In another aspect of the invention, the at least first value characterizes the average noise power.

Another aspect of the invention indicates a method for measuring a level and storing a false echo, in which a decision is made whether or not false echo data are initialized and/or updated as a function of at least one first value that characterizes at least one property of a first noise or at least corresponds with the first noise. Given an affirmative decision, the false echo data are then initialized and/or updated.

Another aspect of the invention indicates a program element which, when implemented on a processor of a level meter, instructs the processor to execute the steps described above and below.

Another aspect of the invention involves a computer-readable medium that stores a program element which, when implemented on a processor (i.e., a computer) of a level meter, instructs the processor to execute the steps described above and below.

In another exemplary embodiment of the invention, the computer is designed to decide whether or not the false echo data are to be initialized and/or updated as a function of at least a second value, which describes at least one property of a second noise or at least corresponds with the second noise.

In addition, the computer is designed to then actually carry out the initialization and/or update.

The second "noise" is a sensor-inherent noise, and/or container noise and/or EMC noise.

In particular, several values attributable to a noise may be used to update and/or initialize the false echo data.

In another exemplary embodiment of the invention, the computer is designed to determine the at least first value and/or the at least second value using an echo curve acquired beforehand.

For example, the computer is designed to determine the at least first value and/or the at least second value based on a regression computation or histogram analysis.

In another exemplary embodiment of the invention, the computer is designed to initialize and/or update false echo data as a function of the at least first value and/or the at least second value.

In another exemplary embodiment of the invention, the computer is designed to determine whether the amplitude of a sampled value for an acquired echo curve is larger than the first value (the one corresponding to the noise, i.e., to the container noise or sensor noise or EMC noise, for example). If the amplitude of the sampled value is not (clearly) greater than the first value, the false echo data that chronologically correspond with this sampled value are deleted or reset.

In another exemplary embodiment of the invention, the computer is designed to determine whether the first value that describes at least a property of a first noise (meaning the current container noise or current sensor-inherent noise or the EMC noise) is greater than the second value corresponding with a predetermined sensor-inherent noise. If the first value is greater than the second value (or if the first value is clearly greater than the second value), the computer activates a fault memory update mode.

In other words, the fault memory updating mode is activated if the currently measured noise is greater than a reference noise stored during sensor fabrication, for example.

It should be noted that the two exemplary embodiments mentioned above may be combined.

In another exemplary embodiment of the invention, the level meter also has a memory in which the second value can be stored, for example. In particular, the false echo curve can be stored in this memory.

In another exemplary embodiment of the invention, executing the method steps of the fault memory updating mode leads to a reduction of values for a false echo curve stored in the memory if the first value (e.g., the container noise or thermal noise or the EMC noise) drops.

For example, there is a drop in all amplitude values of the false echo curve having nothing to do with the actual level echo or a false echo drop (i.e., attributable solely to container noise and/or EMC noises).

In another exemplary embodiment of the invention, the level meter is a level radar.

The illustrations in the figures are diagrammatic and not to scale.

The same reference numbers are used for identical or similar elements in the following description of the figures.

DETAILED DESCRIPTION OF EXEMPLARY EMBODIMENTS

The present invention relates to a method for measuring filling levels of all kinds.

Figure 1:
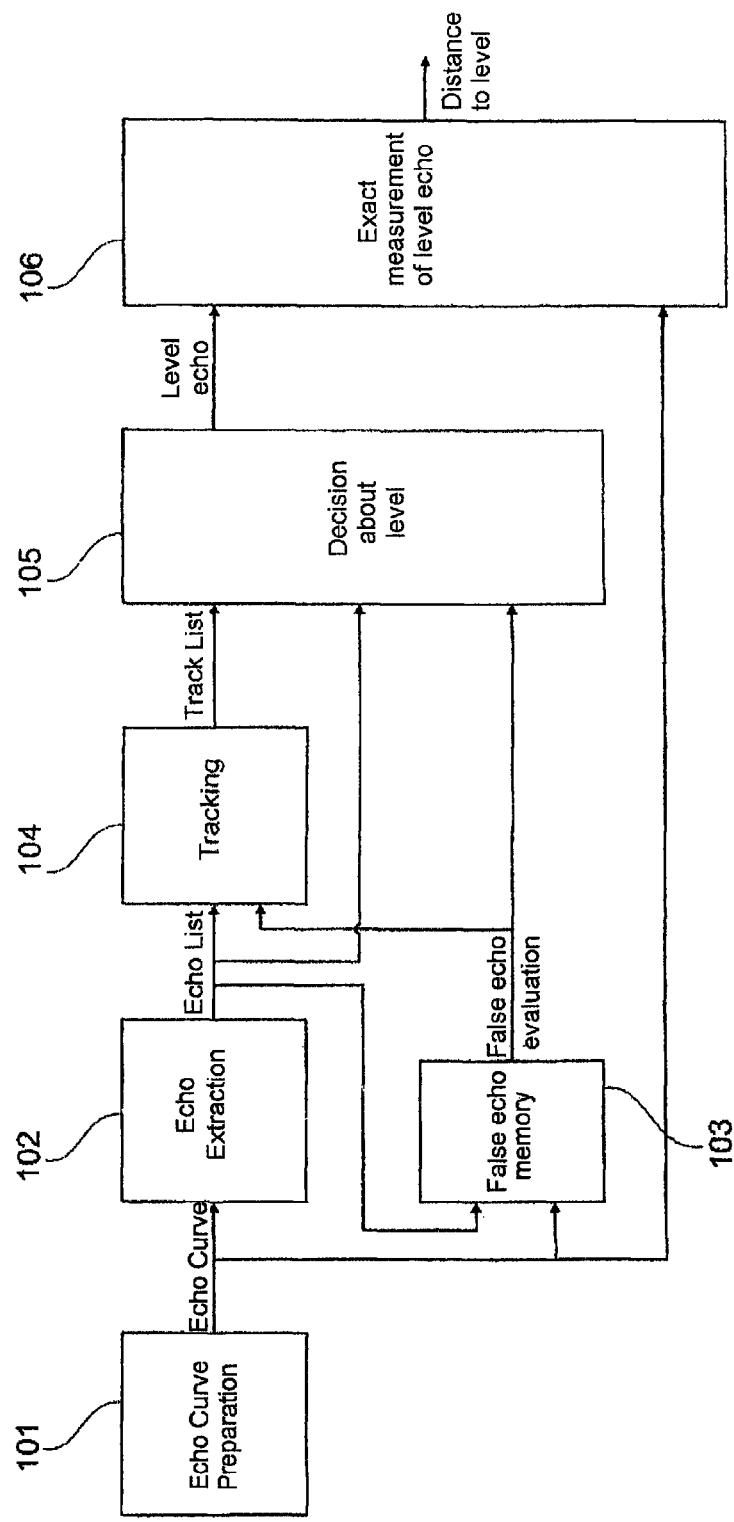
FIG. 1 shows a possible procedural approach during echo signal processing.

FIG. 1 shows the basic sequence of echo signal processing inside a level meter. The "echo curve preparation" block 101 contains all hardware and software units necessary to render an echo curve as an image of the current reflection conditions inside a container. For example, the echo curve is acquired in digital form inside a microprocessor system, and analyzed for echoes contained therein using specific procedures.

The procedures used within the "echo extraction" block 102 for this purpose encompass in particular procedures from the area of threshold-based echo extraction, or procedures involving a scale-based echo extraction. After the echo extraction procedure has run its course, a digital echo list is prepared, for example providing information about the start, location and end of one or more echoes contained in the echo curve.

Inside the false echo memory 103, the echoes of the echo list are compared with a false echo curve generated in the device beforehand, in order to obtain information about which echoes on the echo list are being caused by fault locations permanently built into the container. The obtained information is made available externally as a false echo evaluation list, and can be beneficially used by Tracking 104, for example, but also by Level Decision 105.

In order to further increase the reliability of echo signal processing for a level meter, the detected echoes are put in historical context within the "Tracking" block 104. Tracking in particular tracks the progression of the location of an echo over several individual measurements, and represents this gathered information as a track in the memory. The collected history information for several echoes is provided externally as a track list.

The "Level Decision" block 105 adjusts the data in the current echo list, information about the chronological progression of individual echoes and evaluations of the false echo memory relative to each other. Taking the false echo evaluation determined by the fault memory is here of special importance for suppressing fault reflections.

In order to further improve the precision of level measurement, the position of the determined level echo can be ascertained with a high degree of accuracy via the optional "Exact Measurement of Level Echo" block 106 using computer time-intensive procedures, for example, interpolation processes.

The determined distance to the level is externally provided. This can take place in analog (4.20 mA interface) or digital (field bus) form.

The advantages to the invention stem from the special initial conditions to which echo signal processing is subjected inside a level meter.

Figure 2:
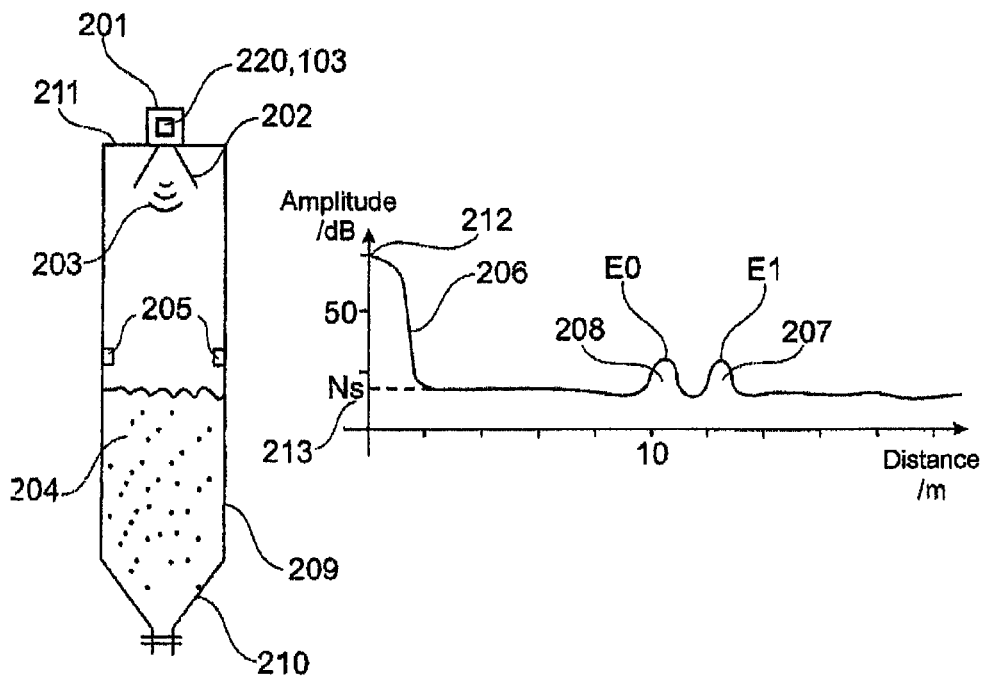
FIG. 2 shows a level meter built into a container, as well as a corresponding echo curve.

FIG. 2 shows a typical application for such a device.

Let it be noted at this juncture that all levels in the present specification and accompanying figures are to be understood as relative levels. The absolute level is used as a reference variable for computing the relative level, and has no influence whatsoever on how the present invention works.

The level meter 201 emits a signal 203 toward the medium 204 to be measured via the antenna 202. The level meter itself can determine the distance to the medium by means of ultrasound, radar, or lasers, or based on the guided microwave principle. Correspondingly, both ultrasound waves and electromagnetic waves are possible as the signals. The medium 204 reflects the incident wave back to the meter, where the latter is received and processed by the computer 220.

At the same time, the emitted signal is also reflected by components inside the container, for example a continuous weld seam 205. In addition to the useful echo 207 caused by the level 204, the echo curve 206 received in the level meter 201 can hence also contain echoes of permanently installed fault locations 208, which are referred to below as false echoes. The filler container 209 has a conical outlet 201 in the present example.

Figure 3:
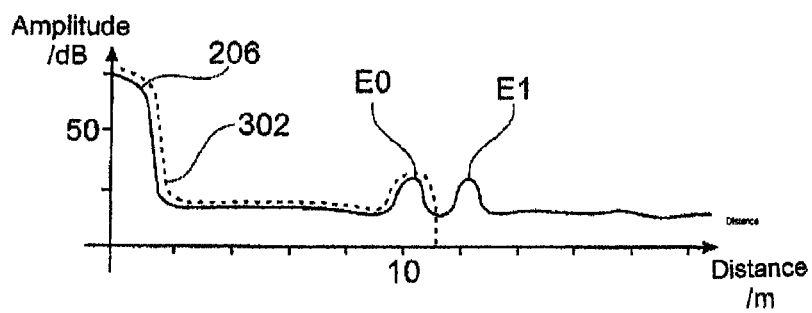
FIG. 3 shows a false echo evaluator in a level meter.

The echo curve is specifically analyzed for echoes during the now initiated signal processing stage (see step 102 on FIG. 1). An echo list 310 based on the scheme depicted on FIG. 3 is generated as the result of echo extraction. In addition to the characteristic parameters of the false echo E0, 208 generated by the weld seam 205, the echo list also contains another echo E1, 207 generated by the medium 204.

Of course, the described features of the echo list only represent a special implementation of an echo list. Echo lists with additional or modified features of an echo are also used in practice.

The decision as to which of the present echoes (E0, E1) is the level echo generated by the medium 204 can be greatly simplified by means of false echo storage. For example, a false echo storage to be initiated by the user is preferably performed with the container nearly empty. As the result of this procedural step, a false echo curve 302 is created inside the false echo memory 103 (see FIGS. 1 and 2), which precisely determines the amplitude progression of possible false echoes E0, 208. In the ensuing operating phase of the sensor, the false echo memory 103 and false echo curve 302 contained therein can be used to classify the echo of the echo list 301. In the present example, echo E0 208, 03 is unambiguously recognized as the false echo, and evaluated accordingly. The decision as to whether the remaining echo E1 207, 304 is a level echo becomes trivial, despite the nearly identical amplitude values for the echoes on the echo list 301.

The sensor may also automatically initiate the creation of the false echo curve.

The method described above may result in problems time and again during practical implementation.

Figure 4:
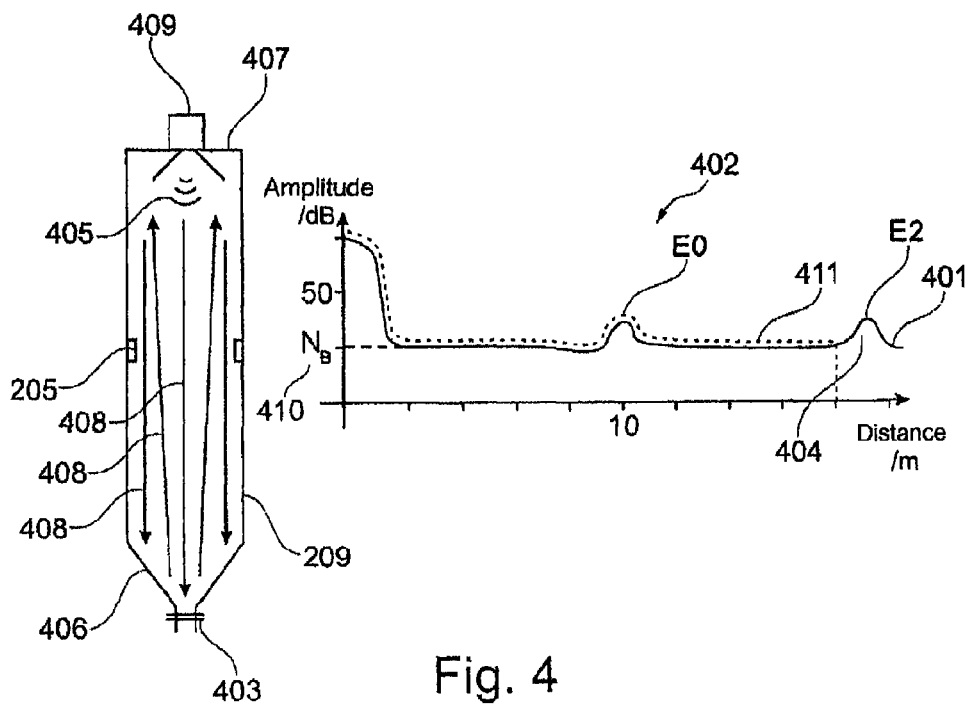
FIG. 4 shows an echo curve given an empty container.

FIG. 4 shows the container 209 with the continuous weld seam 205 in the empty state. The echo curve 401 measured therein is represented in the graph 402. As clearly evident when compared to the echo curve 206 on FIG. 2, the echo E0 208 caused by the weld seam 205 appears again at the identical location, while the level echo caused by the filler 204 is replaced by the echo E2 404 caused by the container floor 403 due to an absence of filler.

Also curious upon closer examination during a direct comparison with the echo curve 206 from FIG. 2 is that the noise level $N_B$ 401 of the echo curve 401 lies at approx. 25 dB, while the comparable level $N_S$ 213 on FIG. 2 measures approx. 15 dB.

The graphically visualized effect of a noise level increase can be the result of the special reflection conditions that can arise during the use of level meters.

The wave 203 emitted by the level meter 201 is reflected on the surface of the filler 204 in the half-filled container 209 on FIG. 2. For example, this reflection is accompanied by a strong dampening of the emitted wave 203. Therefore, the signal received by the level meter could lie 40 dB or more under the level of the initially emitted wave. Signal portions deflected by the container cover 211 once again after reflected by the medium strike the surface of the filler 204 a second time after a corresponding transit time, and are there reflected anew. During this second reflection, the wave could again be dampened by another 40 dB. Assuming that the reflected relative level 212 measures approx. 80 dB, for example, it immediately becomes evident that the level of a twice-reflected wave lies far below the level of the sensor-inherent noise $N_S$ 213 of the level meter. The sensor-inherent noise of a level meter is essentially caused by the thermal noise of the used semiconductor elements, and typically measures approx. 15 dB in commercial level meters.

Other conditions now arise during measurements in completely evacuated containers with very good reflection conditions. FIG. 4 illustrates the conditions. In the exemplary case of a level measurement with radar examined here, the emitted wave 405 is reflected by the container floor 403, and also by the conical container sections 406 of the metal container 209. Due to the excellent reflection properties of the metal container wall, the radar signal is only very weakly dampened by this reflection. A majority of the originally emitted signal energy can hence be reflected by the container cover 407 again. It becomes evident right away that the low reflection losses make it possible for the signal to be reflected back and forth between the container cover and container floor very often. The signal arrows 408 are intended to illustrate the repeated propagation of the signal in the container. The level meter 409 initiates periodic measuring cycles, for example in a time increment corresponding to the transit time of the emitted signal over a length of 40 m.

Due to the perfect reflection conditions, both signal portions of the last measurement and chronologically preceding measurements can move back and forth 408 in the container at the start of a new measurement. All signals simultaneously arriving at the detector of the level meter now interfere in the receiving section of the level meter. Given the numerous possible signal paths that arrive concurrently at the detector and overlap there, the accompanying individual echoes could no longer be separated, and symptomatically result in an increase of the noise level $N_B$ 410 to approx. 25 dB.

The noise level $N_B$ is caused by the overlapping of various signal portions from the container, and will be regarded as container noise below. Let it be noted at this juncture that, in terms of origin, this "container noise" has nothing in common with the sensor-inherent noise $N_S$ of the sensor, which is triggered by thermal noise portions. The nomenclature will be used in the present specification exclusively due to the similarity with respect to the progression of a received echo curve.

If a false echo storage process is now initiated based on known procedures given an empty container, an elevated false echo curve 411 is stored in the sensor. The false echo E0 caused by the weld seam 205 is correctly contained therein. The floor echo E2 caused by the container floor is not incorporated in the false echo memory, since it is to be used as the current level given an empty container.

Figure 5:
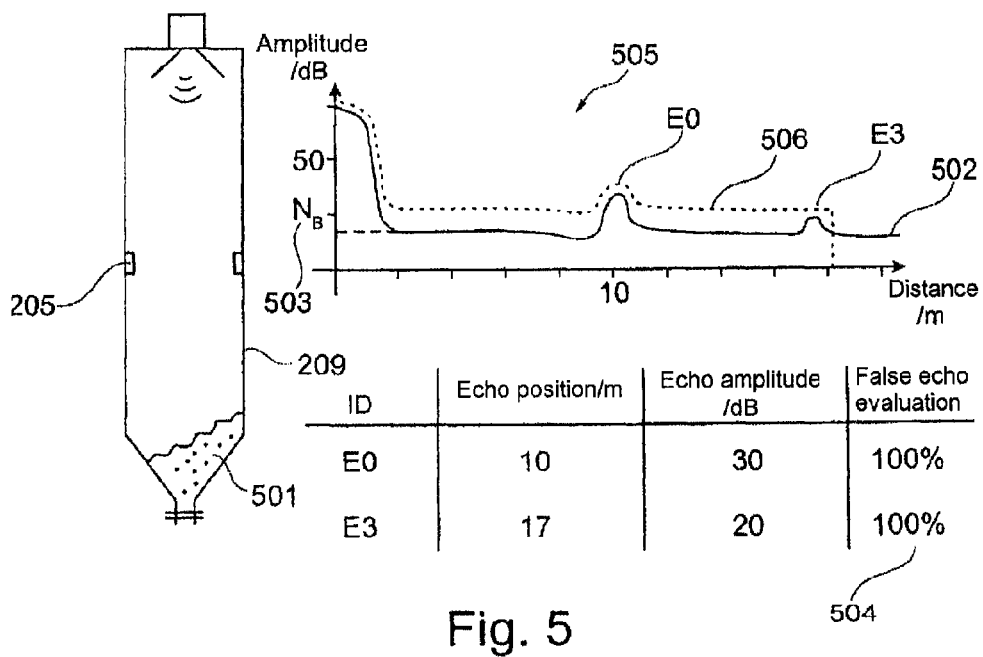
FIG. 5 shows an echo curve given a slightly filled container.

In another step, FIG. 5 now shows the conditions that might arise after the container has been slightly filled. A sudden, strong dampening of the reflected radar wave now sets in, owing to the material properties of the filler 501 (which is loose material) and the concurrent unfavorable pouring location. The cyclic reflection of signal portions inside the container 209 that was still evident on FIG. 4 is immediately brought to a standstill. In addition to the weld seam reflection (E0), the received echo curve 502 contains the reflection of the filler (E3), but the latter can only be received on a highly reduced scale in terms of amplitude. As evident from the echo curve 502 at the same time, the container noise $N_B$ 503 has again dropped to the level of the sensor-inherent noise $N_S$ of the level meter 213. The echo table 504 generated based on the echo curve 502 clearly shows that both the echo E0 of the container weld seam 205 and the echo of the medium 501 are identified as a false echo. A comparison with the echo curve depiction 505 shows that the echoes E0 and E3 both lie under the false echo curve 506 in terms of their progression, and consequently are regarded as a false echo. A measurement is no longer possible in this state. The level meter will generate an "echo lost" error message, for example.

Figure 7:
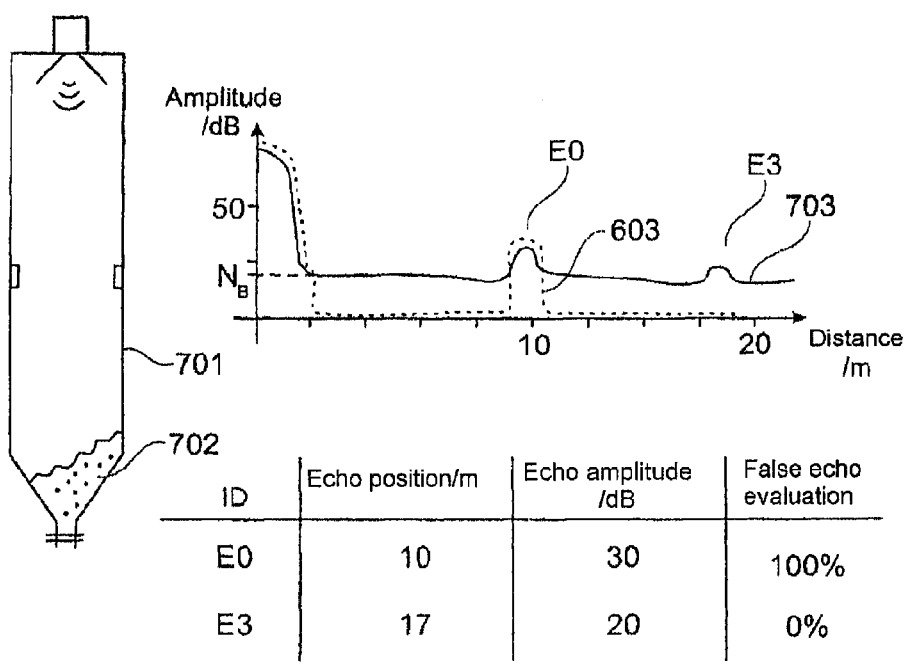
FIG. 7 shows the false echo evaluator according to an exemplary embodiment of the invention.
Figure 8:
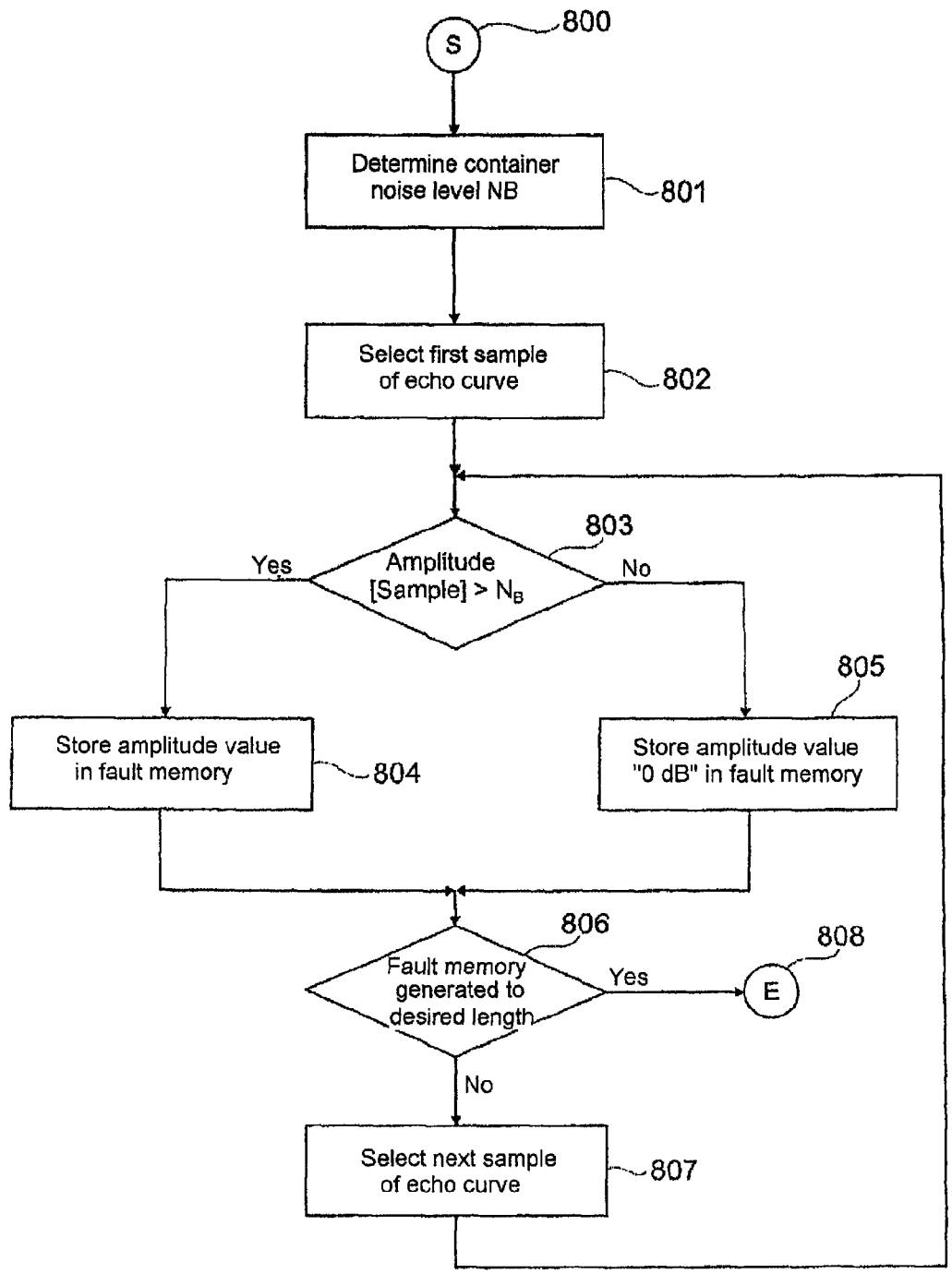
FIG. 8 shows a flowchart of a method according to an exemplary embodiment of the invention.

In a first embodiment of the invention, this problem is resolved based on the sequence diagram on FIG. 8. The resulting conditions are illustrated by the depictions on FIGS. 6 and 7, for example.

The procedure begins with the initialization or updating of a false echo memory 103 (see FIGS. 1 and 2), wherein the aforementioned actions can be initiated by the user or the sensor itself. In step 801, the current echo curve is used to determine the container noise level $N_B$. Corresponding procedures are used here, for example a regression calculation or a histogram analysis.

The first sampling point of the current echo curve is now selected in step 802 (selection of the first echo curve sample). If the amplitude of this sample is greater than the determined container noise level $N_B$, this amplitude is used in step 804 to initiate or update the fault memory. Of course, additional algorithms can be used in this procedural step to improve the function of a false echo memory, for example increasing the false echo values to be stored by a parameterized offset value. If the amplitude of the echo curve is not significantly greater than the container noise, the fault memory is deleted at the appropriate location, or alternatively set to 0 dB 805. The described procedure is now continued sample for sample, until the length of a false echo curve desired by the user has been generated. The procedure finally ends in the final state 808.

Figure 6:
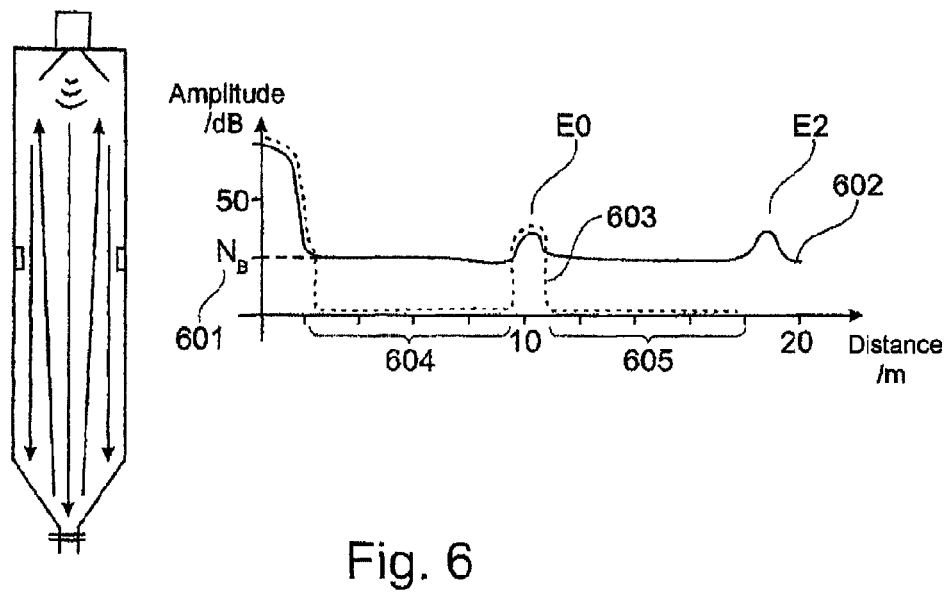
FIG. 6 shows the false echo memory according to an exemplary embodiment of the invention.

FIG. 6 now shows the ramifications of the described procedure when creating the false echo memory. The level of container noise $N_B$ 601 is identical to the level of the echo curve 602 over broad ranges. As a consequence, the false echo memory is initialized to 0 dB at between 2 m and 9.5 m 604, and also at between 10.50 m and 18 m.

FIG. 7 now shows the conditions while filling the container 701 with filler 702. The absence of multiple reflections causes the container noise $N_B$ determined from the echo curve 703 to drop. In addition, the level echo E3 drops to a level of less than 25 dB. However, due to the false echo curve 603 generated according to the invention, the false echo memory 1093 (see FIGS. 1 and 2) is now able to identify only the echo E0 as a false echo. The echo E3 can be easily identified as a level echo.

Figure 9:
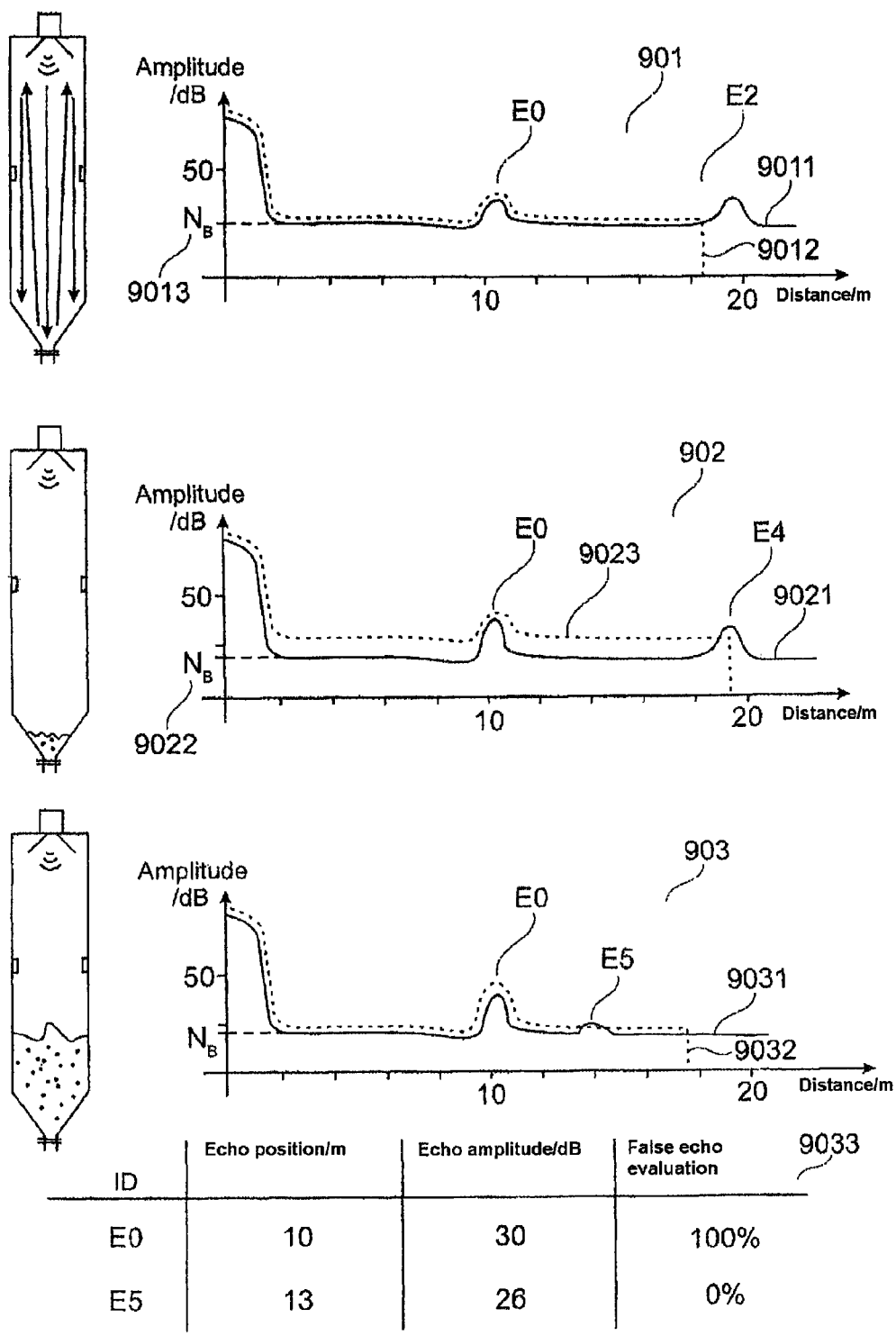
FIG. 9 shows the false echo memory according to another exemplary embodiment of the invention.
Figure 10:
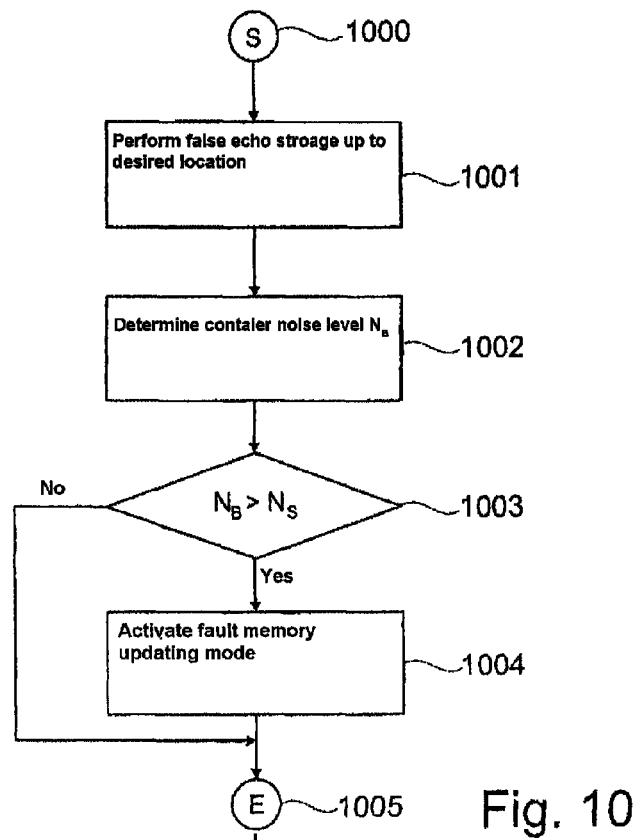
FIG. 10 shows a flowchart for fault memory initialization.
Figure 11:
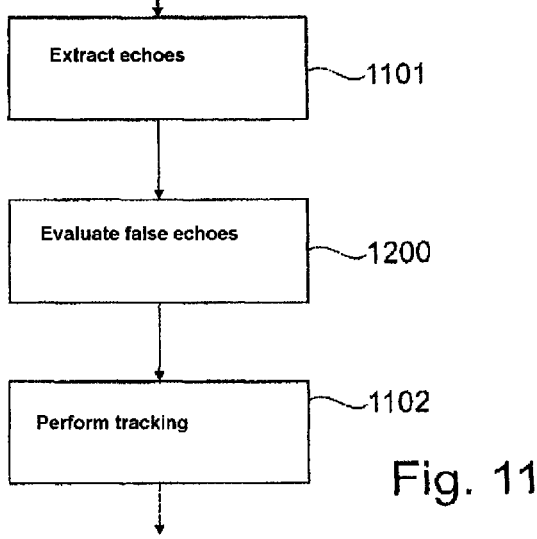
FIG. 11 shows a flowchart for level measurement.
Figure 12:
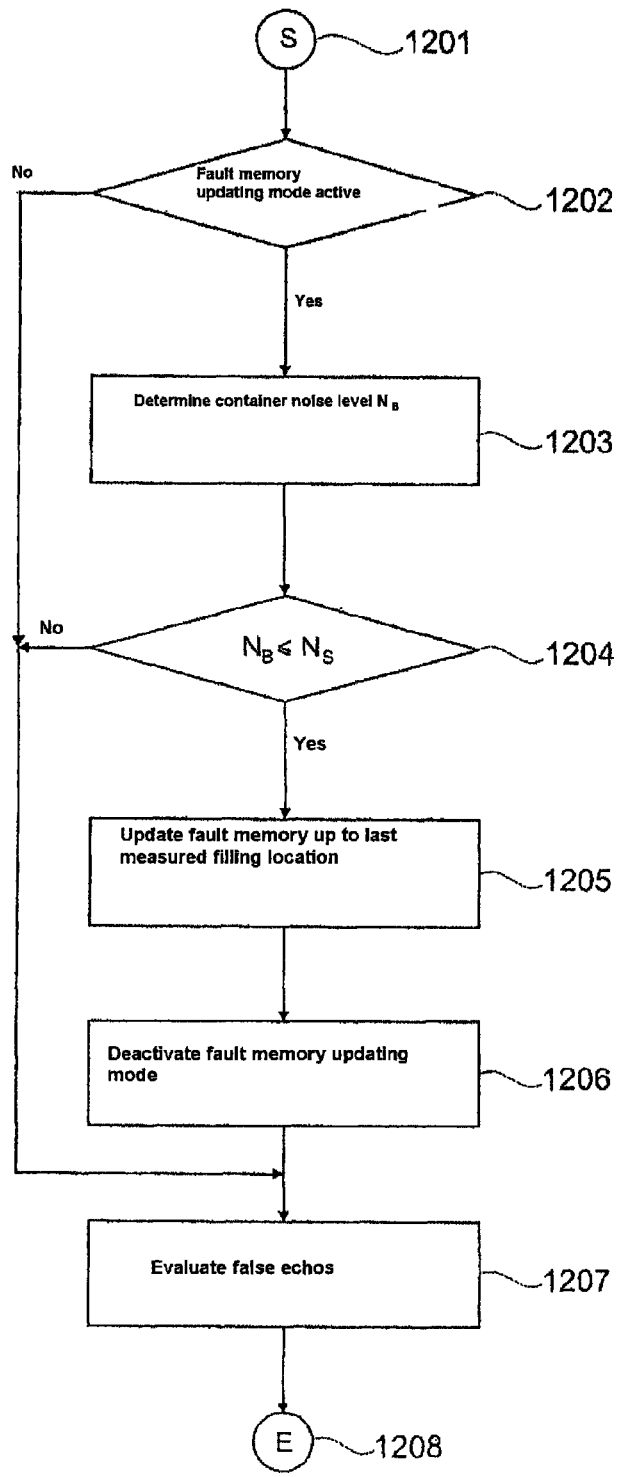
FIG. 12 shows a flowchart for false echo evaluation according to an exemplary embodiment of the invention.

In another embodiment of the invention, the problem can also be resolved according to the sequence diagrams on FIGS. 10 to 12. The conditions arising as a result are illustrated by example in the depictions on FIG. 9.

The method is divided into two parts. Method part I is shown on FIG. 10, and represents that part of the procedure that takes place as part of initializing or updating a false echo memory 103. The procedural part begins at step 1000. The false echo is stored up to the desired location in step 1001. Known procedures can be used for this purpose. The desired location is either stipulated by the user, or determined by other software parts inside the sensor. A false echo storage is usually performed up to a location with a distance slightly less than the distance to the start of the current level echo. In step 1002, the currently present echo curve is used to determine the noise level $N_B$ in the container. For example, this can be done via a regression calculation or histogram analysis.

Step 1003 now involves checking whether the container noise $N_B$ is greater than the sensor-inherent noise of the level meter $N_S$. To this end, the sensor-inherent noise is determined at the manufacturing facility of the level meter, and stored in a suitable form in the non-volatile memory region 103 of the sensor as a calibration value. If the container noise is greater than the sensor-inherent noise of the sensor while initializing or updating the false echo memory, the fault memory updating mode is activated 1004 during signal processing.

FIG. 11 presents an exemplary cutout from the signal processing chain within a level meter of the kind that is normally run through once in each measuring cycle.

For example, the classic evaluation of false echoes 1200 is called up immediately after the extraction of echoes. According to the invention, the block 1200 is now completely replaced by the sequence of method part II, which is depicted on FIG. 12.

The modified method step 1200 begins in state 1201. A check is initially performed to determine whether the fault memory updating mode has been activated.

If not, the process branches directly to method step 1207. The evaluation of false echoes that takes place there can be performed according to previous methods. The determined echoes are preferably compared with the false echo curve stored in the fault memory, and evaluated accordingly.

However, if the check in method step 1202 shows that the fault memory updating mode has been activated, the container noise level $N_B$ is initially determined in step 1203 as a function of or based upon the currently existing echo curve. If the container noise $N_B$ has dropped to the system noise level $N_S$ of the sensor determined at the factory, the false echo curve is updated in the false echo memory, wherein the current echo curve ranging from 0 m to the location where the level echo last measured begins is stored in the false echo memory. Finally, the fault memory updating mode is deactivated in step 1206, before a routine evaluation of the false echo takes place in method step 1207.

The method ends in step 1208.

FIG. 9 illustrates the ramifications of using the method according to the invention. Echo curve depiction 901 shows the conditions given an empty container. The course of the current echo curve 9011 in a range of up to 18 m is stored in the false echo memory based on the initiated false echo storage process. The resultant false echo curve 9012 is also visualized in the depiction 901. The fault memory updating mode is also activated owing to the elevated container noise level $N_B$ 9013.

Depiction 902 shows the echo curve 9021 as received when the container has been slightly filled. The container noise 9022 decreases very rapidly down to the level of sensor-inherent noise $N_S$ stored at the factory. In light of the activated fault memory updating mode, this is taken as a prompt to again initiate a fault storage inside the sensor. The false echo curve 9023, 9012 stored to that point is updated up to a distance of 17 m using the currently existing echo curve 9021. In addition, the fault memory updating mode is activated again.

From this point on, the sensor operates in a normal mode according to prior art. Depiction 903 shows an echo curve 9031 of the kind that can be received with the container filled more. In the meantime, the false echo curve 9032 was updated using echo curve 90921, and no longer contains any portions of an elevated container noise. The level echo E5 stemming from the filler now lies clearly over the false echo curve 9032, while the false echo E0 can still be reliably recognized as a false echo 9033. The echo E5 can be reliably and easily identified as a level echo.

The present method compensates for the effect of a rise in container noise given a completely evacuated container. In addition, the present method can be suitable for offsetting a rise in EMC noise.

The method is used for initializing and/or updating the false echo memory 103 of the level meter, and characterized by the fact that initializing and/or updating the false echo memory depends on at least one value for the noise.

In particular, initializing and/or updating the false echo memory can depend on at least one value for the sensor-inherent noise 213. Initializing and/or updating the false echo memory can also depend on at least one value for the container noise 410. In addition, the initializing and/or updating process can depend on at least one value for the EMC noise.

Let it also be noted that "comprising" and "having" do not preclude any other elements or steps, and "one" or "a" does not rule out a plurality. Let it further be noted that features or steps described with reference to one of the above exemplary embodiments can also be used in combination with other features or steps from other exemplary embodiments described above. Reference numbers in the claims are not to be construed as a limitation.

The invention claimed is:

1. A level meter for measuring a level and storing a false echo, comprising:
    a processor for at least one of initializing and updating false echo data, the processor being designed to decide whether or not the false echo data are to be at least one of initialized and updated as a function of at least one first value, the first value corresponding to at least one property of a first noise,
    wherein the processor is further designed to decide whether or not the false echo data are to be at least one of initialized and updated as a function of at least one second value, the second value corresponding to at least one property of a second noise,
    wherein the second noise is at least one of a sensor-inherent noise, a container noise and an EMC noise,
    wherein the processor is designed to determine whether the first value is greater than the second value, and
    wherein the processor is designed to activate a fault memory updating mode if the first value is greater than the second value.

2. The level meter according to claim 1, wherein the first noise involves at least one of a sensor-inherent noise, a container noise and an EMC noise.

3. The level meter according to claim 1, wherein the at least first value characterizes an average noise power.

4. The level meter according to claim 1, wherein the processor is designed to determine one of (a) the at least one first value and (b) the at least one second value using an acquired echo curve.

5. The level meter according to claim 1, wherein the processor is designed for determining one of the at least one first value and the at least one second value based on a regression calculation or histogram analysis.

6. The level meter according to claim 1, wherein the processor is designed for at least one of initializing and updating false echo data depending on at least one of (a) the at least one first value and (b) the at least one second value.

7. The level meter according to claim 1, wherein the processor is designed for determining whether an amplitude of a sampled value for an acquired echo curve is greater than the first value and wherein the processor is designed for one of deleting and resetting the false echo data corresponding to the sampled value if the amplitude of the sampled value is not greater than the first value.

8. The level meter according to claim 1, further comprising:
    a memory arrangement storing at least one of the at least one first value and the at least one second value.

9. The level meter according to claim 8, wherein the fault memory updating mode leads to a reduction of values relating to a false echo curve stored in the memory arrangement if the first value drops.

10. The level meter according to claim 1, wherein the level meter is a filling level radar.

11. A method for measuring a level and storing false echoes, comprising the steps of:
    deciding, by a processor, whether or not false echo data are to be at least one of initialized and updated depending on at least one first value and at least one second value, the first value corresponding to a property of a first noise, the second value corresponding to at least one property of a second noise, and wherein the second noise is at least one of a sensor-inherent noise, a container noise and an EMC noise;
    determining, by the processor, whether the first value is greater than the second value;
    activating, by the processor, a fault memory updating mode if the first value is greater than the second value; and;
    performing, by the processor, when the decision is affirmative, at least one of initializing and updating the false echo data.

12. A non-transitory computer-readable medium that stores a program element which, when implemented on a processor of a level meter, instructs the processor to execute the following steps:
    deciding whether or not false echo data are to be at least one of initialized and updated depending on at least one first value and at least one second value, the first value corresponding to a property of a first noise; the second value corresponding to at least one property of a second noise, and wherein the second noise is at least one of a sensor-inherent noise, a container noise and an EMC noise:
    determining, by the processor, whether the first value is greater than the second value;
    activating, by the processor, a fault memory updating mode if the first value is greater than the second value; and
    performing, when the decision is affirmative, at least one of initializing and updating the false echo data.

* * * * *